Patented July 11, 1944

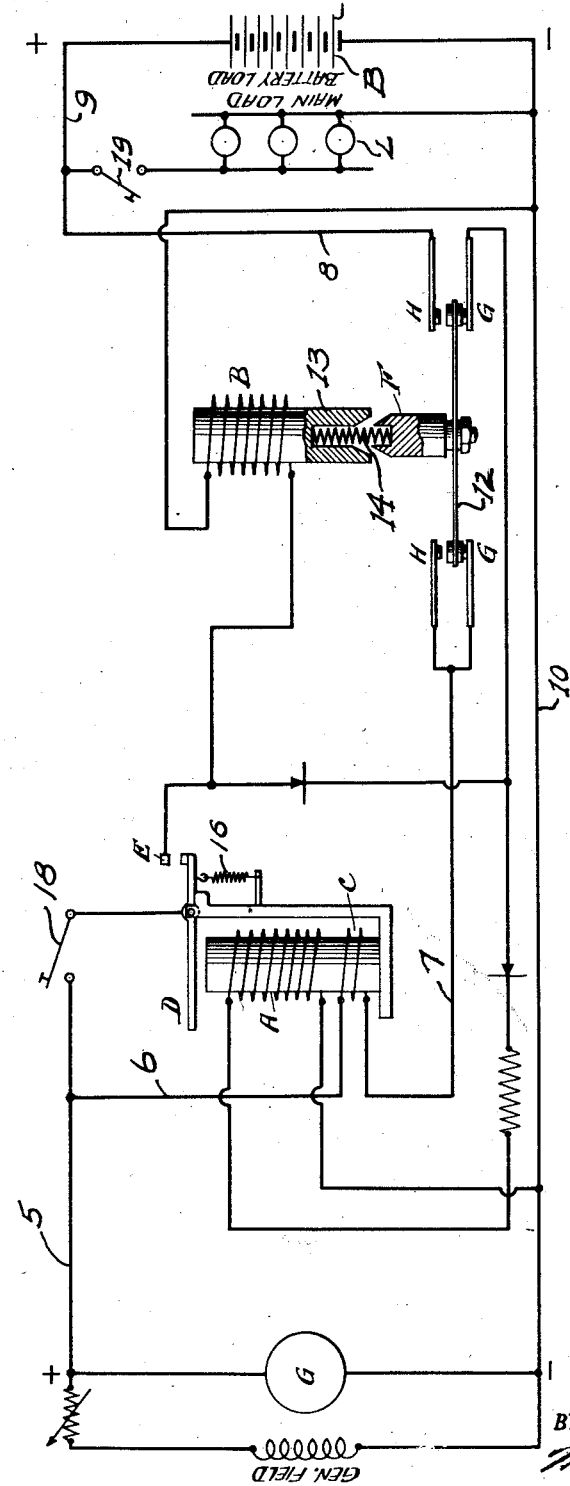

2,353,281

UNITED STATES PATENT OFFICE 2,353,281

ELECTRICAL APPARATUS

Robert G. Taylor, Hasbrouck Heights, and Clinton C. Honeywell, Teaneck, N. J., assignors to Bendix Aviation Corporation, Bendix, N. J., a corporation of Delaware Application November 21, 1942, Serial No. 466,442

8 Claims. (Cl. 320—40)

This invention relates to circuit controlling mechanism, and particularly to means for controlling the flow of current in a battery-generator circuit of the character employed to supply the current-consuming equipment of a motor vehicle, airplane, or other craft having a built-in power plant driven at variable speed.

The conventional reverse-current relay in automotive vehicle installations includes a core having "shunt" and "series" windings. The shunt winding is adapted to initially close the relay contacts when the generator voltage reaches the particular value for which the relay is adjusted. The series winding aids the shunt winding in holding the contacts closed as long as the generator voltage exceeds the battery voltage, so that the generator is supplying current to the battery, and acts oppositely to open the relay contacts upon first surge of current from battery to generator, as when the generator speed drops. If such a relay were to be applied to a generator-battery system of the character now required in aircraft installations (involving generators of far greater current capacity, and having two or more generators, each with its own voltage regulator, supplying power to a common battery and load circuit) this conventional two-winding relay would not, per se, be satisfactory.

One reason is that after one or more generators have been feeding the battery circuit for a certain period, the battery terminal voltage may be higher than the voltage at which the relay for another incoming generator would close. Under these conditions, as when the driving engine is idling at a speed just high enough to cause the relay to close, the relay will close and then promptly open because of reverse current. This closing and opening ("chattering" or "fluttering") will continue as long as the generator voltage remains lower than the battery voltage and yet higher than the voltage required for the shunt coil to close the relay.

Another reason is that the higher current values now obtaining require use of larger conductors and hence fewer turns, so that the magnetic effect of the series winding may be relatively weak with small reverse current. As is well known, the ampere-turns (magnetic exciting effect) required to cause a relay of this type to close initially is less than the ampere-turns required to hold the relay closed, since the armature is closer to the core in the closed position. For this additional reason the reverse current relay may have a tendency to "chatter" or "flutter" if the generator voltage remains near the closing value. This fluttering action causes undue wear on the relay and on the contacts connecting the generator to the battery circuit, and may cause damage to the contacts or to the generator if the reverse current is excessive. Therefore some means is desired to minimize the possibility of such "chattering" or "fluttering."

An object of this invention is, therefore, to provide novel controlling methods and means for application to a generator-battery circuit, to assure a greater measure of protection for the generator and control apparatus.

Another object is to provide a system of control circuits and parts, one of which parts is a reverse-current relay, and the other parts having novel inter-relationship thereto, and to each other.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing the generator is shown at G, the battery at B, the main load at L, and the main line conductors at 5, 6, 7, 8, 9 and 10, the last-named being the negative side while the positive side includes not only the leads 5, 6, 7, 8 and 9, but also the relatively heavy winding C of the reverse current relay, as well as the bridge piece 12 of the switch assembly H—G—F. The part F of assembly H—G—F is the movable pole-piece or plunger of the solenoid whose winding is shown at B, and whose fixed pole-piece is shown at 13; there being a spring 14 across the air gap to bias the bridge-piece 12 into engagement with contacts G—G of the switch assembly when no current is flowing through B.

Winding A of the reverse current relay is the usual "shunt" winding, and spring 16 biases armature D away from contact E when the excitation is less than normal. Switches 18 and 19 are hand-controlled.

Taking the condition first when F and D are in their closed positions, as generator voltage is lowered below the battery voltage, reverse current flows through coil C so as to produce a flux which opposes the flux of the main coil A and hence reduces the net flux in the magnetic circuit of the relay, causing the armature D to move sufficiently to open the contacts E. Opening these contacts causes both the coil A circuit and the coil B circuit to open, thus reducing the flux in the relay circuit to zero and allowing armature D to drop to its normally open position and plunger F to drop to its normally open position, in which bridge-piece 12 engages contacts G—G. The resulting opening of the circuit at H—H interrupts the reverse current, and as the piece 12 engages contacts G—G it closes the coil A circuit. Hence the circuit to coil A is in condition to cause switch E to close again when line voltage reaches its proper value. Due to the time delay between the time from the opening of contacts E until the plunger F closes contacts G—G, there is an appreciable period wherein no current flows through coil A, hence the armature D is certain to return to its normally open position. At the end of such period plunger F reaches contacts G—G, and current again flows through coil A, but with a lowered line voltage and the armature D in a wide open position; and contacts E will not re-close until the generator voltage rises to the proper closing value.

What is claimed is:

1. In a generator-battery system, a reverse current relay including a shunt coil connected to one terminal of said generator and a series coil connected to the opposite terminal of said generator, a switch interposed between said series coil and the battery, means for moving said switch to a position completing a circuit between said series coil and said battery, and means for moving said switch to a position completing a circuit across said generator running from said series coil to said shunt coil, said two means being in opposition, and alternately predominating, depending upon the relationship between generator and battery voltages.

2. In a generator-battery system, a reverse current relay including contacts, a shunt coil connected in series with said contacts for connection across said generator and a series coil, a switch interposed between said series coil and the battery, and means for moving said switch to a position completing a circuit between said series coil and said battery, said means including a solenoid having a winding in series with said relay contacts and in shunt relation to the battery terminals.

3. In a generator-battery system the combination, comprising, a reverse current relay including contacts, a first coil and a second coil, said first and second coils connected in series across said generator, said first coil connected in series with said contacts for connection across said generator and battery, a switch interposed between said second coil and the battery for connecting said second coil in series relation with said battery and generator, and means for moving said switch to a position completing said series connection between said second coil, battery and generator, said means including a solenoid having a winding in series with said relay contacts, and said relay contacts arranged for connecting said winding in shunt relation across said generator.

4. In a generator-battery system, the combination, comprising, a reverse current relay including a shunt coil and a series coil, a switch adjustable from a first to a second position, first control contacts actuable by said switch in said first position, a first circuit controlled by said first control contacts running from said series coil to said shunt coil and connecting said coils in circuit with said generator, second control contacts actuable by said switch in said second position, a second circuit controlled by said second control contacts and connecting said series coil in circuit with said battery, first biasing means for moving said switch from said first position to said second position, and second biasing means for moving said switch from said second position to said first position, said first and second biasing means being in opposition and alternately predominating depending upon the relationship between generator and battery voltage.

5. A generator-battery system, comprising, in combination, a first electromagnetic winding, first and second circuits for connecting said first winding across said generator, control means for alternately opening and closing said first and second circuits, said first winding arranged upon said first circuit being closed to cause the actuation of said control means in a first sense so as to successively close said second circuit and then open said first circuit in response to a generator current having a predetermined voltage, a second electromagnetic winding, and a third circuit for connecting said second winding in series with said battery and generator, said third circuit opened and closed by said control means, a second winding arranged in such a manner as to provide an electromagnetic force for causing the actuation of the control means in a second sense in response to a predetermined relationship between generator and battery voltages, said control means arranged upon actuation in said second sense to successively open said second and third circuits and close said first circuit in timed relation so as to provide an appreciable time interval between the de-energization and re-energization of the first winding.

6. A generator-battery system, comprising, in combination, a first electromagnet and a second electromagnet, a first circuit connecting said first and second electromagnets in series across said generator, a first switch movable from a first to a second position, said first switch closing said first circuit when in said first position, a second circuit connecting said first electromagnet in shunt relation across said generator, a second switch movable from a first to a second position by the electromagnetic force of said first and second electromagnets, and said second switch closing said second circuit when in said second position, a third electromagnet, a third circuit connecting said third electromagnet in shunt relation across said generator, and said third circuit closed by said second switch when in said second position, a fourth circuit connecting said second electromagnet in series with said battery and said generator, said fourth circuit closed by said first switch when in said second position, and said first switch movable from said first position to said second position by the electromagnetic force of said third electromagnet, and first biasing means for forcing said second switch from said second position to said first position for opening said second and third circuits upon a predetermined relationship between generator and battery voltage causing said second electromagnet to set up an electromagnetic force counteracting the electromagnetic force of said first electromagnet, and second biasing means for moving said first switch from said second position to said first position upon the de-energization of said third electromagnet caused by the opening of said third circuit.

7. A generator-battery system, comprising, in combination, a first electromagnetic winding, a first circuit connecting said first winding across said generator, a second electromagnetic winding, a second battery charging circuit connecting said second winding in series with said battery and generator, control means opening and closing said first and second circuits, said control means operated by said first electromagnetic winding so as to open said first circuit and close said second circuit in response to generator current, and said control means operated by said second electromagnetic winding so as to open said second circuit and close said first circuit in response to battery current whereby said first and second windings may be alternately energized and de-energized.

8. A generator-battery system, comprising, in combination, a first electromagnetic winding, a first circuit connecting said first winding across said generator, a second electromagnetic winding, a second battery charging circuit connecting said second winding in series with said battery and generator, switch means for opening and closing said first and second circuits, said first and second electromagnetic windings arranged in opposing relation for operating said switch means in accordance with the relationship between generator and battery voltages, whereby upon a predetermined relative increase in battery voltage said first and second windings may be de-energized for an appreciable time interval upon the opening of said second battery charging circuit.

ROBERT G. TAYLOR.
CLINTON C. HONEYWELL.